Dec. 20, 1966  G. H. PHELPS ET AL  3,293,393
FUSE MOUNTING MEANS
Filed July 1, 1963  6 Sheets-Sheet 1
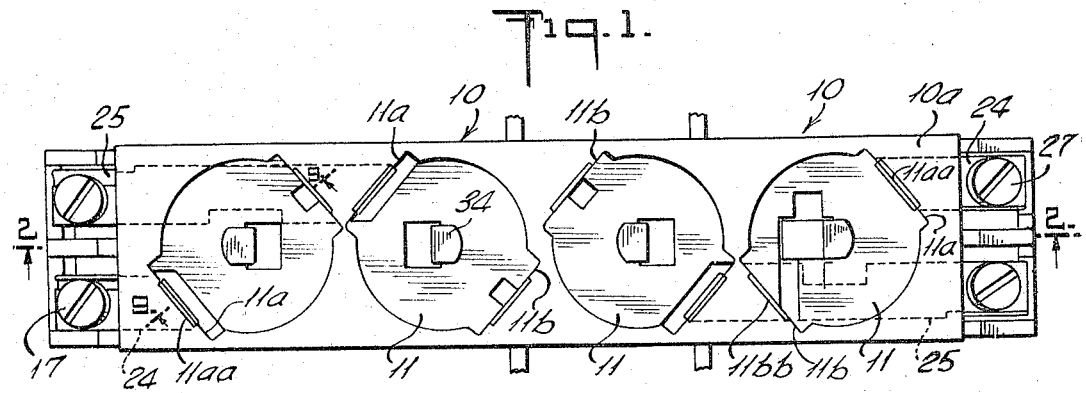
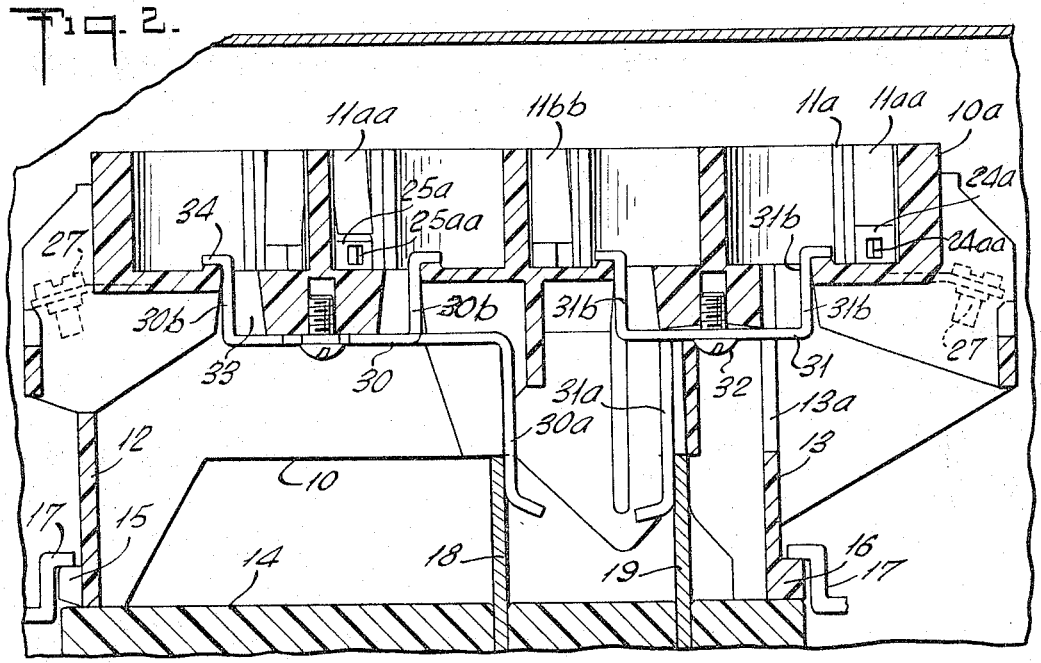
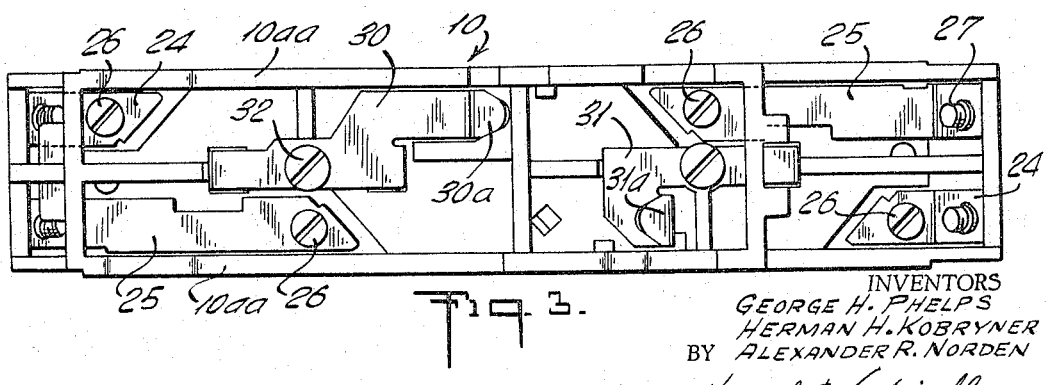
INVENTORS
GEORGE H. PHELPS
HERMAN H. KOBRYNER
BY ALEXANDER R. NORDEN
ATTORNEYS

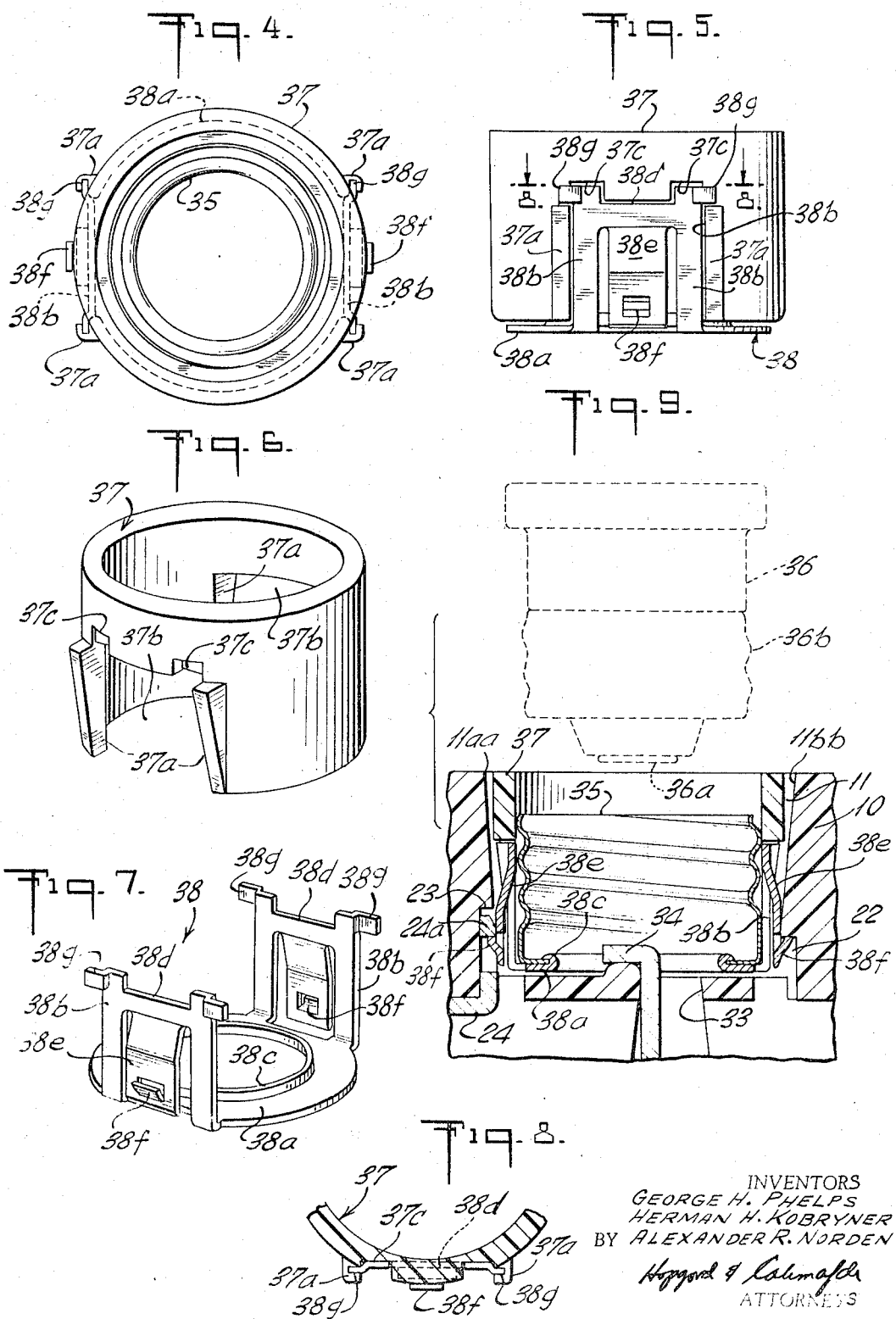

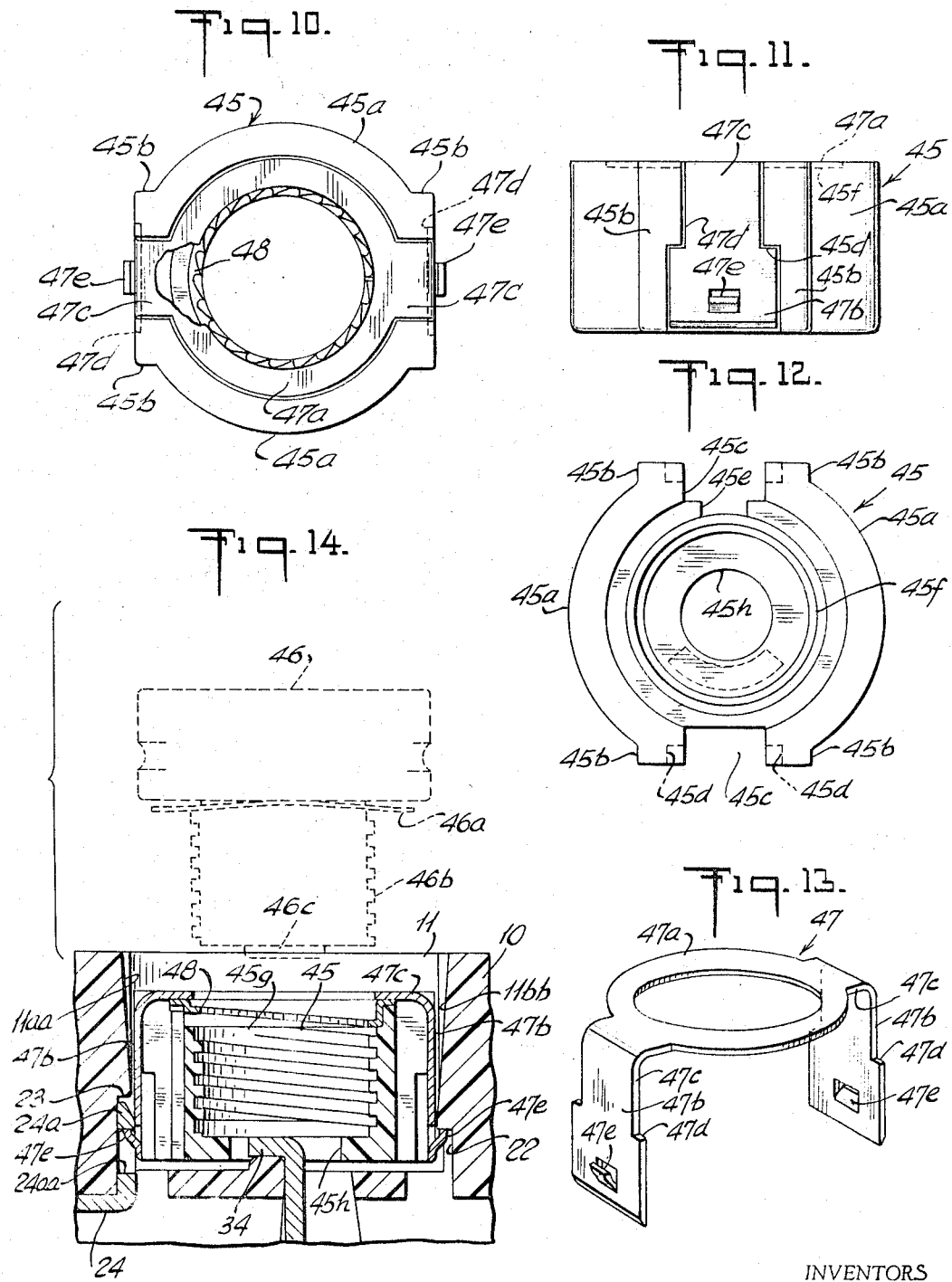

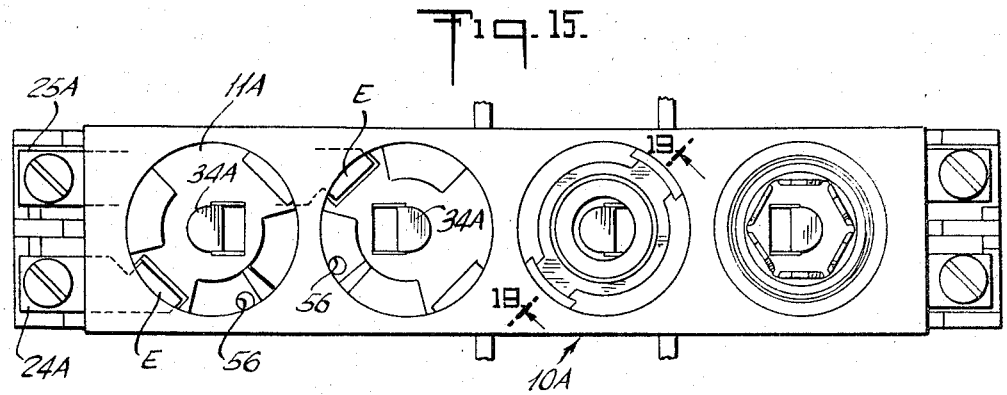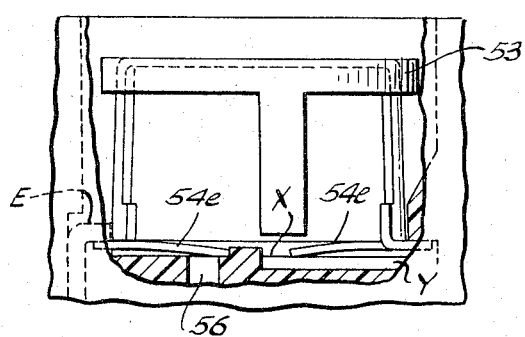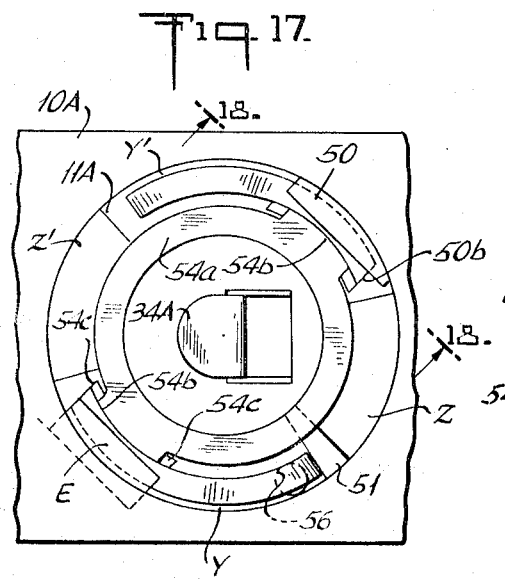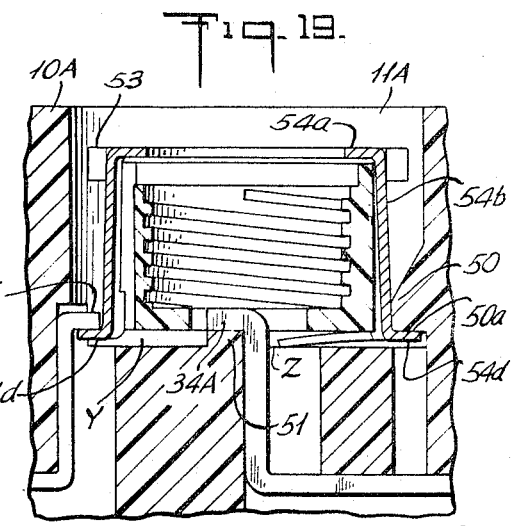

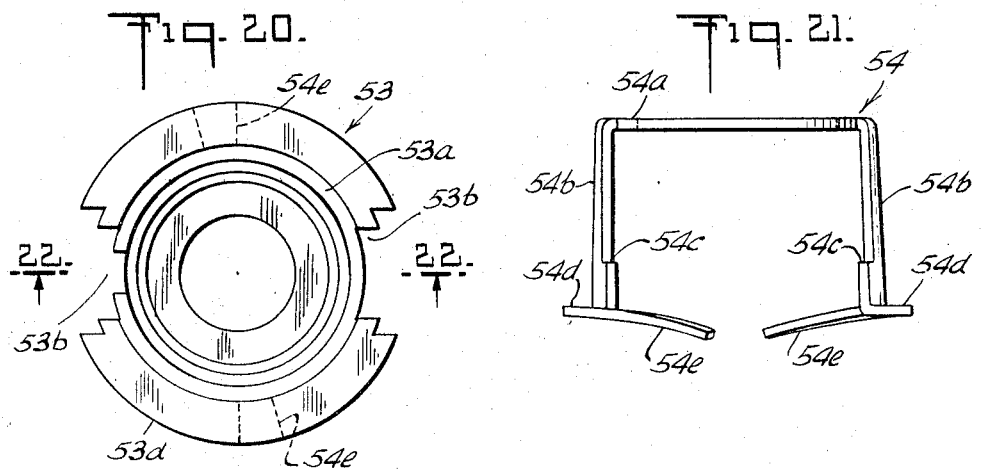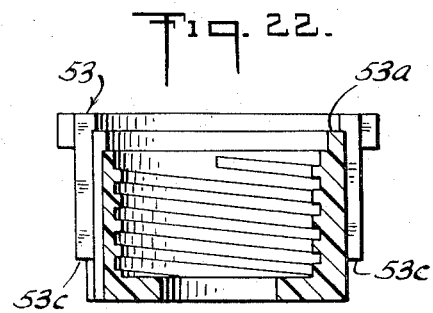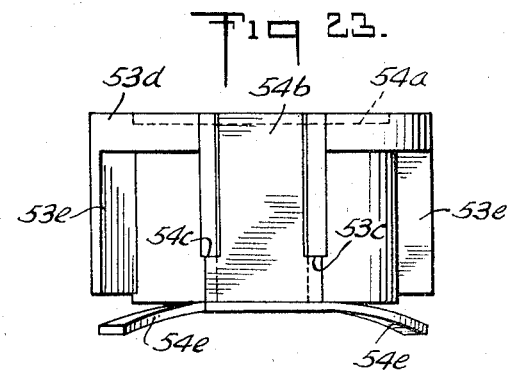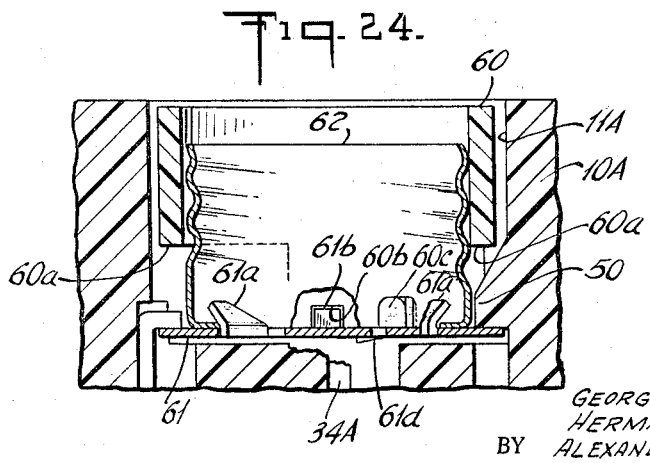

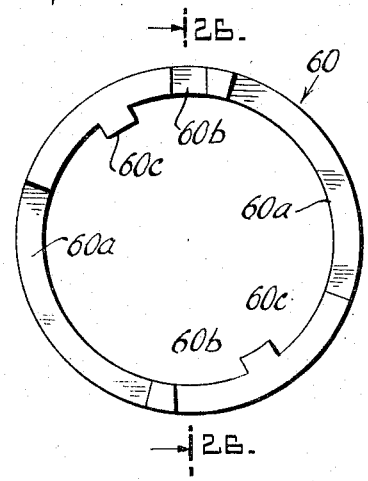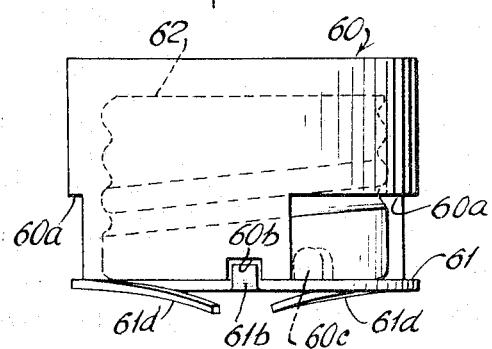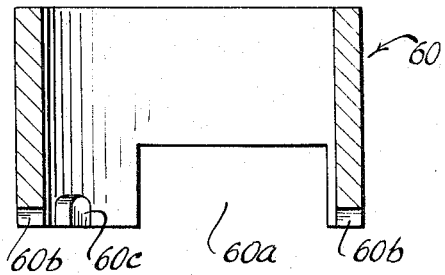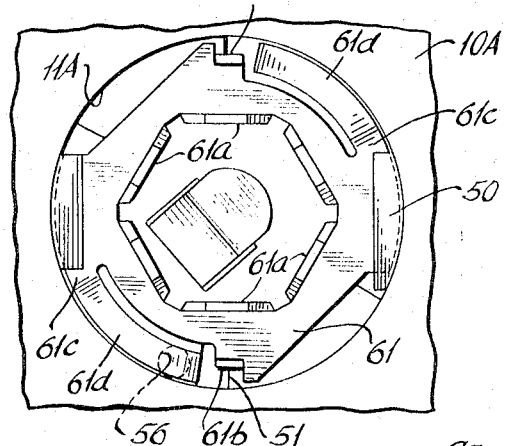

United States Patent Office 3,293,393
Patented Dec. 20, 1966

3,293,393
FUSE MOUNTING MEANS
George H. Phelps, Northport, Long Island, Herman H. Kobryner, Forest Hills, and Alexander R. Norden, New York, N.Y., assignors to Murray Manufacturing Corporation, Brooklyn, N.Y., a corporation of New York
Filed July 1, 1963, Ser. No. 291,771
19 Claims. (Cl. 200—133)

This invention relates to electric power distributing load centers or panel boards and more particularly to fuse mounting means therefor.

An object of the invention is to provide improved fuse mounting means permitting substantial standardization of parts and affording increased flexibility for meeting a variety of fusing requirements.

An object is to provide fuse mounting means including a receptacle for interchangeably accepting different fuse type adapters; specifically Edison type and S type fuse adapters. The invention contemplates an insulating fuse block provided with essentially similar pockets or receptacles interchangeably fittable with different types of fuse adapters. As a corollary, the invention contemplates novel fuse adapters of different types for interchangeably fitting the receptacles.

An object is to provide a novel fuse adapter structure and, more particularly, to provide such fuse adapter structure as may have an essentially plug-in fit into the receptacle.

An object is to provide trapping means between a fuse adapter and a receptacle therefor which will not be damaged and which will not damage the adapter or receptacle if an attempt is made to withdraw the adapter from the receptacle. More specifically, the invention contemplates trapping means including a blocking element of the receptacle and an abuttable element of the adapter brought into blocked relation to the blocking element of the receptacle upon the adapter reaching operative position in the receptacle. In one form of the invention, setting of the adapter in operative position involves an angular or rotative movement of the adapter in a suitable direction and the trap element of the receptacle then blocks the abuttable element of the adapter to prevent reverse rotative movement of the adapter. In another form of the invention, the adapter is moved translatably, or axially, down into operative position in the receptacle and the trap element of the receptacle then blocks the coacting element of the adapter to prevent reverse translatable movement of the adapter. In both forms of the invention, the adapter is restrained by means including the trapping elements from such rotative or translatable movement as may disturb its effective position in the receptacle.

An object of the invention is to provide releasable trapping means for the fuse adapter. Preferably, release of the trapping means is made possible only through the bottom of the receptacle containing the adapter, requiring the fuse block to be detached from the panel board.

An object of the invention is to provide for holding a fuse adapter down in a receptacle by means involving an element of the receptacle superimposed on an element of the adapter. Preferably at least two hold-down elements are provided by the receptacle for holding down the fuse adapter at opposite sides.

An object of the invention is to provide the receptacle with a hold-down contact and to provide the fuse adapter with a contact element held down by the receptacle contact. The hold-down contact is spaced above the bottom of the receptacle and at a distance from the usual center contact of the receptacle and may be referred to as a side or wall contact. The adapter includes a socket for a known type of fuse with a center terminal plug at the bottom for engaging the center contact of the receptacle. In the novel arrangement, tightening of the fuse in the socket tends, by reaction of the fuse terminal plug against the center contact of the receptacle, to force the adapter in a direction to improve the engagement between the hold-down contact of the receptacle and the coacting underlying contact element of the adapter.

An object of the invention is to provide a fuse adapter and accommodating receptacle in which the adapter has an operative angular position around the receptacle axis. Further, the invention contemplates the provision in the receptacle of an off-center contact of limited width around the receptacle axis for engagement with a contact element of the adapter only when the adapter is in its operative angular position in the receptacle.

It is also an object to provide a composite fuse adapter comprising an insulating, peripherally exposed shell, a fuse socket within the shell, and a contact element in effectively fixed relation to the shell. The invention provides Edison and S types of composite fuse adapters. In the Edison type, the contact element is part of a ring form fixed to the bottom of an Edison type fuse socket extending within the insulating shell of the adapter. In the S type of adapter, the shell is internally threaded to provide an S type of fuse socket and the contact element is part of a ring form which extends over the top of the shell for engagement by the bowed contact terminal of the S type fuse. According to the invention, the contact element and the shell may be detachable from each other. Particularly such detachment is contemplated for the S type adapter so that a standardized contact element may be associated with any of differently rated S type socketed shells.

The above mentioned and other features and objects of the invention and the manner of attaining them will become more apparent and the invention itself will be best understood by reference to the following description of illustrative species of the invention taken in conjunction with the accompanying drawings, wherein:

FIG. 1 is a top view of an illustrative fuse block for interchangeably mounting first form Edison and S type fuse adapters;

FIG. 2 is a section on line 2—2 of FIG. 1;

FIG. 3 is a bottom view of the fuse block;

FIG. 4 is an enlarged top view of a first form Edison type fuse adapter;

FIG. 5 is an enlarged side view thereof;

FIG. 6 is an enlarged perspective view of the shell element of the first form Edison adapter;

FIG. 7 is an enlarged perspective view of the contact metal connector of this adapter;

FIG. 8 is a fragmentary section on line 8—8 of FIG. 5;

FIG. 9 is an enlarged vertical section showing the first form Edison adapter in operatively plugged-in position in a pocket of the fuse block, the plane of the section being along line 9—9 of FIG. 1;

FIG. 10 is an enlarged top view of a first form S type fuse adapter;

FIG. 11 is an enlarged side view thereof;

FIG. 12 is an enlarged top view of its shell member;

FIG. 13 is an enlarged perspective of its contact element.

FIG. 14 is a section similar to FIG. 9 but with the first from S type adapter plugged into a pocket of the fuse block;

FIG. 15 is a top view of a fuse block similar to the fuse block of FIGS. 1 to 3 but with receptacles or pockets for interchangeably mounting second forms of Edison and S type fuse adapters;

FIG. 16 is an enlarged, fragmentary side view, partly broken out and sectioned, showing a pocket of the FIG. 16 fuse block occupied by a second form S type adapter;

FIG. 17 is an enlarged, fragmentary top view showing the contact element of the second form S adapter in a pocket, the rest of the adapter being omitted from the view for purposes of the illustration;

FIG. 18 is a section on line 18—18 of FIG. 17;

FIG. 19 is an enlarged section on line 19—19 of FIG. 15;

FIG. 20 is an enlarged top view of the shell and socket member of the second form S type adapter;

FIG. 21 is an elevation, on the same scale, of the contact element of the second form S type adapter;

FIG. 22 is a section on line 22—22 of FIG. 20;

FIG. 23 is an elevation of the second form S type adapter as seen at a right angle to the view in FIG. 16;

FIG. 24 is a section similar to FIG. 19 but with a pocket of the FIG. 16 fuse block occupied by a second form Edison type fuse adapter;

FIG. 25 is an enlarged bottom view of the shell of this adapter;

FIG. 26 is a section on line 26—26 of FIG. 25;

FIG. 27 is an elevation of the second form Edison type adapter; and

FIG. 28 is an enlarged top view similar to FIG. 17 but with the contact element of the second form Edison type adapter in position in a pocket, the remainder of this adapter being omitted to clarify the showing.

Referring to FIGS. 1 to 3, an illustrative fuse block 10 has a deck 10a of four similar, open-topped pockets or receptacles 11 into which first forms of the Edison and S type fuse adapters may be interchangeably and retentively plugged. Legs 12 and 13 of block 10 rest on support plate 14 of the panel board and have toes 15 and 16 hooked under angles 17 to keep the fuse block in place. Obviously, other and additional means may be used to mount the fuse block in the panel board. Included in the panel board are bus blades 18 and 19 connected to the power line.

Pockets 11 are open at the top to admit fuse holders or adapters; the pocket bottoms are sections of the deck floor and are closed except for appropriate access openings. Each pocket is mainly right cylindrical in form with diametrically opposite substantially tangentially disposed offset sections 11a and 11b. The offset sections are formed intermediate their sides with wedge portions 11aa and 11bb sloped inwardly toward the bottom of the pocket, as best seen in FIGS. 9 and 14. Below the wedges, the pockets have notches 22 and 23 of which notches 23 are deeper and accommodate the upturned ends 24a and 25a of terminal strips 24 and 25. These strips are led to the pockets from opposite ends of the deck 10a to enable use of short strips. The pockets have different angular dispositions about their axes (see FIG. 1) to stagger their offset sections and hence their notches 23 in a manner permitting only two forms of the strips to suffice and enabling these strips to be as straight and simple as possible. The arrangement locates the offset section 11a and hence the notch 23 of the first left-hand pocket, as viewed in FIG. 1, below a longitudinal center through the axes of the pockets, this notch then being at an acute angle, about 40 degrees, to the left end of the deck. The offset section 11a and notch 23 of the second pocket from the left are located above the longitudinal center line and at an angle of about 135 degrees to the left end of the deck. A like relation obtains between the right-hand end of the deck and the notches 23 in the first and second pockets from the right. Thus two short strips 24 serve the first pocket from the left and the first pocket from the right and two longer strips 25 serve the second pocket from the left and the second from the right. The strips are attached by screws 26 to the underside of the deck 10a and inhibited from turning out of position by engagement with flanges 10aa of the deck. In attached positions of the strips, their upturned ends 24a and 25a are in pocket notches 23 while the other ends of the strips extend outside the deck and carry connector screws 27 for branch circuit leads.

It may be here noted that the notch 22 in each pocket will serve as a hold-down, trapping element associated with the pocket for trapping an inserted first form fuse adapter. The upturned terminal strip ends 24a and 25a, in pocket notches 23, are off-center, side or wall contacts of the pockets and are formed with holes 24aa and 25aa, respectively, to serve as other hold-down, trapping elements for first form adapters.

Multi-armed blades 30 and 31, of resilient contact metal, such as spring bronze, are fastened by screws 32 to the underside of the deck 10a. Blades 30 and 31 are formed with downwardly bent arms 30a and 31a for pressing against the sides of bus blades 18 and 19, respectively. The blades form the subject matter of copending patent application, Serial No. 336,948 filed January 10, 1964, in the names of Henry H. Kobryner and Alexander Norden and assigned to Murray Manufacturing Corporation.

A pair of upwardly bent arms 30b of blade 30 pass through access openings 33 in the bottoms of the two pockets at the left, as viewed in FIG. 2. Similarly, blade 31 is provided with bent-up arms 31b which pass through access openings in the bottoms of the other two pockets. The free ends of the arms 30b and 31b are bent over to serve as center contacts 34 for fuses.

The first form Edison type fuse adapter, shown in FIGS. 4 to 9, has an inner part consisting of a conventional threaded, contact metal Edison fuse socket 35 to receive an Edison type fuse 36. The outer structure of the adapter consists of two releasably interlocked parts 37 and 38. Part 37, shown detached in FIG. 6, is a shell made of insulating material and is generally cylindrical to fit closely into the cylindrical segments of the pocket 11, the pocket depth and the shell length being substantially equal.

Projecting from the shell periphery are diametrically opposite symmetrical pairs of keys 37a. Each key starts substantially flush with the periphery of the shell at the bottom and tapers outwardly to an upper end located a distance below the top of the shell. The shell is open between the keys of each pair, the opening 37b having no bottom and having its top formed by the thickness of the arcuate shell section between the upper ends of the flanking keys. A short continuation of the key sides flanking the opening 37b is provided by walls of recesses 37c relieving the ends of the shell segment which forms the top of the opening 37b. The keys are spaced and sized, at their upper ends, to fit the corners of the offset, keying sections 11a and 11b of a pocket 11. It is seen that the shell 37 has a form adapting it for keyed plug-in fit into the internal side-wall form of any of the pockets 11, whereby the shell is guided for translatable movement down into the pocket to occupy a definite angular or rotative position therein.

Part 38, shown detached in FIG. 7, is the contact element of the first form Edison type fuse holder and is made of springy contact metal. It has a generally U-form with a ring-like base 38a constituting a ring contact, and two, symmetrical, diametrically opposite arms or yokes 38b rising vertically from the ring contact and in generally chordal relation to the outer perimeter of the base. The inner circle of the ring contact 38a has a rimming flange 38c to fit through the hole in the bottom of socket 35, the flange being initially upright, as indicated in FIG. 7. Socket 35 is assembled to the ring contact by placing the socket bottom on the ring contact, with the hole in the socket bottom encircling the flange 38c. The flange is then pressed down, as may be understood from FIG. 9, to fix the socket relative to the contact element 38.

Each of the yokes 38b itself resembles an inverted U with legs spanned a short distance below the upper ends by a bridge 38d. Extending down from the bridge is a tongue 38e flexed forwardly and capable of being sprung back. Punched forwardly from the lower portion of tongue 38e is an upwardly directed hook element 38f. A pair of ears 38g project forwardly and laterally from the portions of the legs of the U extending above the bridge 38e. The width of the yoke 38b across its legs is such that the yoke will fit, with working clearance, between the sides of either opening 37b of shell 37. The yoke can enter the opening 37b to a height limited by abutment of bridge 38d with the top of the opening, the portions of the yoke legs then being accommodated in the recesses 37c in the top wall of the opening. The spacing between the opposite yokes corresponds to the spacing between the diametrically opposite openings 37b of the sleeve 37.

When the parts of the Edison type fuse holder are assembled, ring contact 38a is under and coaxial with shell 37, the socket 35 fixed on the ring contact is inside the shell, and the yoke 38b occupy the openings 37b except for the portions of the yoke legs seated in recesses 37c and the yoke ears 38g resting on the keys 37a. During insertion of the yokes into the openings 37b, the ears 38g ride up the inclined fronts of the keys 37a which flex the yoke outwardly until the ears pass the upper ends of the keys, whereupon the yoke springs back to inward positions in which the upper portions of the legs of the yoke abut the flat bottoms of recesses 37c (see FIG. 8 particularly) and the ears 38g rest on the tops of the keys. The part 38 is thus suspended from and yoked to the part 37 against relative turning or axial movement beyond a slight tolerance amount. The part 38 may be removed from part 37 by forcing the yoke outwards until its ears 38g slip off the tops of the keys 37a.

The assembly of parts 35, 37 and 38 is a plug-in Edison type fuse holder adapted for keyed insertion into any of the pockets 11 of the fuse block 10. The keying compels the fuse holder to enter the pocket 11 in a definite rotative aligned position in which the hook elements 38f of the fuse holder are engaged with the inwardly sloped pocket sections 11aa and 11bb leading to the hooking or trapping elements associated with the pocket. One such hooking element is the upper wall of the pocket notch 22 at the base of the wedge section 11bb. The other of the hooking elements is provided by the hole in the wall contact, 24a in FIG. 9, which is seated in the pocket notch 22 below the wedge section 11aa of the pocket. It may be noted here that since the halves of the fuse holder are symmetrical, its aligned position relative to the pocket may be either of two rotative positions 180 degrees apart and between which no distinction need be made.

During insertion of the fuse holder, as the hook elements 38f on spring tongues 38e ride down the wedge sections 11a and 11b of the pocket, the tongues are forced back until the free ends of the hook elements pass the trapping points of the complementary hook elements associated with the pocket. When this occurs, the tongues 38e spring back toward their normal positions and snap the hook elements 38f into trapped coaction with their complementary hook elements associated with the pocket. Considering the hook element 38f riding down the wedge section 11bb of the pocket, when the hook element passes the base of this wedge section, it snaps into the notch 22 and is trapped therein. With respect to the hook element riding down the wedge section 11aa, when it passes the base of this section, it meets a beveled surface of the wall contact, 24a in FIG. 9, and continues down the beveled surface until it is in position to snap into the hole 24aa of the wall contact. The upper end of the hole 24aa and the top of the notch 22 are in alignment across the pocket so as to be reached at the same time by the diametrically opposite hook elements 38f of the fuse holder.

Once the fuse holder or adapter is fully inserted, it cannot be removed from the pocket except by first dismounting the fuse block 10 from the panel board and then inserting suitable tools through access holes in the bottom of the pocket to release the hook elements 38f from their trapped positions in the pocket. Such procedure makes it unlikely that the average user of the equipment will tamper with the inserted fuse holders.

With a fuse holder plugged into a pocket, the insertion of a fuse 36 into the fuse socket 35 brings the plug terminal 36a of the fuse into engagement with the center contact 34 at the bottom of the pocket. The other terminal of the fuse comprises its threaded metal shell 36b which connects to the pocket wall contact 24a or 25a, as the case may be, through the conductive fuse socket 35, the attached ring contact 38a of the contact metal connector part 38, and the hook 38f engaged with the wall contact. It is to be noted that tightening of the fuse in the socket forces the socket and hence the fuse holder part 38 upwardly from center contact 34 and thus improves the electrical engagement between the hook element 38f and its trapping pocket wall contact.

FIGS. 10–14 show the first form S type fuse holder or adapter for fitting a pocket 11. This embodiment includes a shell member 45, of insulating material, internally formed as a threaded S type socket for a commercial S type fuse 46 and externally formed for keyed plug-in fit in a pocket 11 and for interlocking assembly with a contact metal connector member 47.

The member 45 has an external form characterized by symmetrical, diametrically opposite cylindrical segments or lobes 45a from the ends of which extend keying wings 45b. The lobes 45a and wings 45b are adapted for complemental plug-in keying fit into the cylindrical sections and the keying corners of the offset sections 11a and 11b of a pocket 11 (see particularly FIG. 1). It may be noted that the halves of the shell are symmetrical as far as the lobes and wings are concerned and it is immaterial whether the shell is keyed into the pocket in one rotative position or in another rotative position 180 degrees from the first, either position being the desired, angular, aligned position.

Between the wings 45b at corresponding ends of the lobes 45a, the shell is formed its full depth with notches 45c widened in their lower halves by shallower notches 45d which extend into the wings. The base of one of the notches 45c is interrupted by a narrower notch 45e. The shell 45 is stepped down at the top to form a concentric ring seat 45f.

The seat 45f and the notches 45c and 45d are formed for complemental fitted reception of the elements of the contact member 47. The member 47 is an integral generally U-form member made of resilient contact metal. It includes a ring contact 47a centered between diametrically opposite arms 47b turned down from radial arms 47c in the plane of the ring contact. The lower portions of the arms 47b are wider than the upper portions to form shoulders 47d. Punched forwardly from the arms 47b are upwardly directed hook elements 47e corresponding to the hook elements 38f of the first form Edison type fuse holder (see particularly FIG. 7). To assemble the member 47 to member 45, the arms 47b are spread apart sufficiently to slip their lower, wider portions over and down past the upper front edges of the opposite pairs of wings 45b until the shoulders 45d of the legs reach the top of the notches 45d. At this point, the arms 47b can spring back to normal to take fitted positions in the notches 45c and 45d, with the front faces of these arms substantially flush with the front faces of the wings 45b. The wider portions of the arms 47b will then be in the notches 45d while the upper portions of these arms will be in the notches 45c, and the shoulders 47d will be substantially engaged with the overlying top walls of the notches 45c to prevent lifting of ring contact 47a from its superimposed position on the member 45. In this superimposed position, the ring contact 47a has its outer periphery against the back of seat 45f; the inner circle of the contact ring is then rimming the upper end of the internal socket structure in shell 45; and the horizontal arms 47c are nested between facing sides of wings 45b.

It is clear that in their assembled condition, the members 45 and 47 are interlocked against significant relative rotary or axial movement. It is also to be noted that there is ample room between the backs of the arms 47b and the back walls of the notches 45d to permit these arms to be flexed inwardly from their normal positions. The members 45 and 47 can easily be disassembled by spreading the arms 47b to bring their shoulders 47d out of the notches 45d, permitting the member 47 to be lifted off. Differently rated S-type socketed shells 45 can thus be readily assembled or disassembled from a standardized member 47, the thread in each differently rated shell restricting the acceptable S-type fuses to those in a given rating range. If desired, further restriction may be had to one only of the ratings in the given range as by the use of an eyelet (not shown) collared by the central opening 45h of the socket base and acting to limit the depth of insertion of a fuse. A conventional scraping ring 48 may be used above the threads of the socket for scouring the threads of a fuse stem 46g being inserted. The ring 48 has a flange rested on the seat 45f of the shell 45 and is held against rotation by a downwardly bent lip 48a extending into the notch 45e of the shell. In assembling the parts of the fuse holder, the contact ring 47a of the part 47 will be superimposed on the flange of the scraping element.

The assembly of parts 45 and 47 constitutes a first form S-type fuse holder for keyed plug-in, translational insertion into a pocket 11 of the fuse block. During insertion, the hook elements 47e ride down the inclined sections 11aa and 11bb of the pocket, forcing the resilient legs 47c back, until the hook elements reach the pocket notch 22 and the hole in the wall contact, 24a or 25a as the case may be, the legs 47c thereupon relax and snap the hook elements 47e into trapped coaction with notch 22 and the wall contact. To extract the first form S type adapter, the trapping means can be released through the bottom of the pocket, in the same manner as explained for the first form Edison type adapter.

When an S type fuse 46, of correct rating, is inserted into the socket member 45 of the plugged-in fuse holder, the bowed, flexible terminal 46a of the fuse engages the ring contact 47a and thus makes connection to the contact couple comprising the wall contact and the hook element 47e trapped therein. The plug terminal 46c at the bottom of the fuse stem 46b engages the center contact 34 at the bottom of the pocket. Tightening of the fuse tends to move the fuse holder upwardly from the center contact 34 and thus improve the engagement between the wall contact and the hook element trapped thereby.

It may be noted that when the fuse holder is in plugged-in position in a pocket, the hooked member 47 imprisons the socketed shell 45 and prevents the user of the equipment from exchanging the shell for one of lower rating.

The pockets 11 in the fuse block 10 may be interchangeably plugged with first form Edison type and S type fuse holders described above. Further, the socket members 45 of the S type fuse holders may vary in rating although the contact and trap members 47 of all these fuse holders are the same in every respect.

FIGS. 15–28 are concerned with second forms of the different types fuse adapters and their mounting means. In FIG. 15, illustrative fuse block 10A is similar to block 10 of FIGS. 1 to 3 but has pockets 11A of a different form, suited for the second form fuse adapters. Center contacts 34A in pockets 11A are like center contacts 34 in pockets 11 of block 10. Contact strips 24A and 25A carried by block 10A differ from the strips 24 and 25 (FIGS. 1 to 3) in their inner end construction. The inner end of each of strips 24A and 25A is bent to extend transversely into an associated pocket 11A and is spaced above the level of bottom surface X of the pocket to serve as a hold-down wall or side contact E. Opposite the contact E, the pocket 11A is formed integrally with an internal bump or projection 50 providing a hold-down shoulder 50a at the height of the hold-down surface of the contact E, the shoulder being flanked at one side by a solid wall 50b of the knob 50 joining the bottom surface X of the pocket, as best seen in FIG. 18. Between the wall contact E and the closed side of knob 50, the bottom of the pocket has arcuately extending shallow recesses Y and Z separated by a lug 51. Recess Y is a small distance below the level of bottom surface X of the pocket, lug 51 is higher than surface X by about the same distance, and recess Z is appreciably deeper than recess Y. Opposite recess Z is a similar recess Z'. Except for the knob 50, the side wall form of pocket 11A is cylindrical.

Either a second form Edison type or S type fuse adapter may be retentively plugged into any of the pockets 11A and one of each type is shown plugged in pockets 11A of the fuse block 10A in FIG. 15. The second form S type adapter will be explained first.

The second form S type fuse adapter (FIGS. 16, 19, and 23) consists of an insulating shell 53 (FIGS. 20 and 22) and a contact member 54 (FIGS. 17 and 21) yoked to the shell. The shell 53 is comparable to the shell 45 (FIGS. 10, 11, 12 and 14) of the first form S type adapter and is similarly internally threaded to provide an S type fuse socket for a commercial S type fuse of a given rating or within a limited rating range. The shell 53 also is recessed at the top to form a ring seat 53a and is slotted at opposite sides, the significant slots being designated 53b. The sides of slots 53b are cut back a distance above the lower end of the shell to form shoulders 53c. Between slots, the periphery of the shell 53 is cylindrical, with upper segments 53d of a size to fit with working clearance into the cylindrical side form of a pocket 11A. Below segments 53d and between diametrically opposite vertical ribs 53e, the shell periphery is recessed and of smaller radius than the radial distance between the pocket axis and the front of knob 50.

The contact member 54 is comparable to contact member 47 (FIG. 13) of the first form S type adapter. Member 54 (FIGS. 17 and 21) is made of springy contact material and has the general form of an inverted U. It has a ring contact top 54a to fit seat 53a of shell 53 and over a serrated ring (not shown for the second form) similar to the serrated ring 48 (FIG. 14) shown for the first form S type adapter. Integrally dependent from opposite sides of the ring contact 54a are similar legs 54b fitting in their upper sections between the sides of slots 53b of the shell 53 and widened below the upper sections to form shoulders 54c for hooking under shoulders 53c of the shell. The legs 54b reach below the shell 53 and are outwardly bent at the lower ends to provide flanges 54d having an outside recess substantially equal to that of the peripheral sections 53d and the ribs 53e of the shell 53. Extending integrally from one side of each flange 54d, in counterclockwise direction therefrom (FIG. 17), is an arcuate spring strip 54e having the same radius as the flange. The strips 54e are given a downward, normal flexure and are equivalent to leaf springs.

It is understood that the contact member may be manufactured as a standardized part which can be sprung into yoked assembly with differently rated S type socketed shells 53.

To plug a second form S type adapter into a pocket 11A, it is dropped into the pocket while in ratative position in which adapter flanges 54d and their spring extensions 54e will fall between wall contact E and wall projection 50. In any other rotative position, one of the ribs 53e will meet the top of the wall projection and prevent bottoming of the adapter. With the adapter dropped in correct rotative position, the free ends of spring extension 54e rest in recesses Z and Z', whereby the adapter is in lowest position, locating the butt ends of the flanges 54d below the level of the under surface of wall contact E and the shoulder 50a of wall projection 50. The adapter may now be turned clockwise, moving the flanges 54d under the wall contact and the shoulder 50a, until the butt end of a flange is stopped by the closed wall 50b of the wall projection 50 (see FIG. 18). Meanwhile, the free end of the spring extension of the flange under the wall contact rides past the lug 51 at the bottom of the pocket and into the recess Y and is blocked by the lug from reverse turning. The entire adapter is thereby blocked against reverse, counterclockwise movement and is trapped in the pocket with flanges 54d under the wall contact and the shoulder 50a. In the trapped position, the free ends of the spring extensions 54e rest on higher surfaces than the bottoms of the recesses Z and Z' and thus lift the adapter to press the flange 54d under the wall contact firmly against the under surface of the wall contact.

It may be noted that recesses Z and Z' can be omitted, in which case the operator will have to press down on the adapter to flatten the spring extensions 54e before turning the adapter clockwise, in order to depress the butt ends of the flanges 54d below the wall contact E and the shoulder 50a of the wall projection.

When the inserter now stops pressing down on the adapter, the spring extensions 54e press upwardly from the pocket bottom to raise the adapter and insure a firm engagement between the wall contact E and the flange 54d trapped under the wall contact. The adapter is then in operative position in which the side terminal 46a (FIG. 14) of an S type fuse inserted in the socket of shell 53 (FIGS. 19 and 22) will be conductively connected through the contact member 54 to the wall contact E, while the center plug terminal 46c of the fuse engages the center contact 34A of the pocket.

If it is desired to extract the inserted adapter of the second form, a tool may be inserted from below the pocket and through an acess hole 56 in the pocket bottom to lift the free end of the spring extension 54e confronted by the blocking lug 51 of the pocket. With the free end of this spring extension lifted clear above the lug 51, the adapter may be turned in reverse, counterclockwise direction to move the flanges 54d of the contact member 54 from under the wall contact E and the shoulder 50a of the knob 50, after which the adapter may be lifted out of the pocket. The extent of counterclockwise movement of the adapter when in down position in a pocket is limited by abutment of the ribs 53e of shell 53 with sides of wall contact E and the knob 50.

The second form Edison type fuse adapter (FIGS. 24 and 27) comprises an insulating shell 60, a ring contact plate 61 (also see FIG. 28) under the shell, and an Edison fuse socket 62 fixed on the contact plate and extending into the shell. The shell is a cylinder to fit with working clearance into the cylindrical form of a pocket 11A. In its lower half, the shell has opposite openings 60a to enable the shell to move down into a pocket without interference by the wall contact E and the projection 50. The contact plate 61 is made of springy contact material and its control opening is rimmed by tabs 61a which are pressed down upon the ring base of the socket 62 to secure the socket upon the contact plate. Lugs 61b struck up from the contact plate fit into bottom notches 60b of the shell to key the contact plate in required angular relation to the shell. The shell also has small bosses 60c at the bottom which enter fully bounded holes 62a in the side of the socket 62 to lock the socket and, hence, the contact plate 61 against significant rotative or vertical shifting relative to the shell.

The contact plate 61 has opposite, symmetrical segments 61c of the same outside radius as the shell radius. Each segment 61c has an uncut section for performing the same function as the flanges 54d (FIGS. 19, 21 and 23) of the contact member 54 in the second form S type adapter. Arcuate and radial cuts are made in the segments 61c of contact plate 61, during manufacture, to provide spring strips 61d which are given a downward normal flexure, as indicated in FIG. 27. The spring strips 61d correspond in form and length to the spring strips 54e of the second form S type adapter. Between each lug 61b of the contact plate 61 and the rear end of the segment 61c following the lug in counterclockwise direction (FIG. 28), the perimeter of the contact plate is shortened at a bias to provide an abrupt rear end for each segment 61c and also to enable the contact plate to be moved down to the bottom of a pocket 11A without striking the wall contact E or the wall projection 50.

The second form Edison type adapter is plugged into a pocket 11A by the same procedure as described for the second form S type adapter and is trapped in the pocket in the same way. It may be noted that the rear end of a segment 61c of the Edison type adapter will engage the wall section 50b of projection 50 of the pocket to establish a clockwise limit position for the adapter in the pocket. When the trapping means is released, counterclockwise turning of the adapter in the pocket is limited by engagement of a side edge of one of the holes 60a, in the shell 60, with the closed side 50b of projection 50.

It is understood that fuse blocks 10 and 10A are merely illustrative. The fuse block may vary in details of construction and form and it may have more or less than four pockets or receptacles for the fuse adapters; for instance, a block with a single receptacle may be used. Also, the contact strips terminating in the wall and center contacts of a receptacle may be varied in form and may extend in diametrically opposite directions from the pocket. It is further understood that either the wall contact or the center contact may be at the power side and the other at the load side of the panel board or load center.

While the foregoing description sets forth the principles of the invention in connection with specific apparatus it is to be understood that this description is made only by way of example and not as a limitation of the scope of the invention as set forth in the objects thereof and in the accompanying claims.

What is claimed is:

1. Fuse mounting means comprising an insulating cylindrical receptacle having fixed therein a peripheral contact of delimited transverse span about the axis of the receptacle, a substantially cylindrical fuse adapter removably inserted in said receptacle, said adapter internally provided with a fuse socket and externally formed for contiguous fit into the side wall form of the receptacle, the adapter including a contact metal connector with a peripheral radially extending portion of delimited transverse span about the axis of the socket for engaging the peripheral contact in the receptacle when the adapter is in operative down position in the receptacle and in a particular rotative relation to the axis of the receptacle, and means between the adapter and the receptacle coacting to establish said rotative relation.

2. The fuse mounting means claimed in claim 1, the external periphery of the adapter being formed for slip fit into the receptacle and the means to establish said rotative relation of the adapter in the receptacle comprising keying means limiting the adapter to substantially translational silp insertion into the receptacle while the adapter is in said rotative relation to the axis of the receptacle.

3. The fuse mounting means claimed in claim 1, the peripheral contact of the receptacle being a hold-down contact and the peripheral portion of the contact metal connector being located on the adapter for engagement under the hold-down contact only when the adapter is in substantially fully inserted operative position in the receptacle.

4. The fuse mounting means claimed in claim 3, the external periphery of the adapter being formed for slip fit into the receptacle, the means to establish said rotative relation of the adapter in the receptacle comprising keying means limiting slip insertion of the adapter into the receptacle to translational insertion while in said rotative relation to the axis of the receptacle, and the peripheral portion of the contact metal connector being flexible to ride down past the peripheral receptacle contact and then outwardly under the peripheral contact when the adapter is in substantially fully inserted position down in the receptacle.

5. The fuse mounting means claimed in claim 1, the external periphery of the adapter and the inside wall of the receptacle having coacting portions enabling translational insertion of the adapter down into the receptacle followed by turning of the adapter to said rotative relation, the adapter when in down position being turnable in a given direction to said rotative relation and upon such turning bringing the off-center portion of the contact metal connector into position under the hold-down off-center contact of the receptacle, and the means for establishing said rotative relation of the adapter in the receptacle comprising means for preventing reverse turning of the adapter when it reaches said rotative relation.

6. A fuse holder for use in a fuse mounting assembly having an insulating fuse block provided with a substantially cylindrical receptacle defining a fuse location and furnished with a side wall contact, the fuse holder comprising an insulating shell having an exposed external peripheral form complementary to the inside side-wall form of the receptacle so as to adapt the fuse holder for essentially plug-in fit in the receptacle, a fuse socket structure within the shell, and a contact metal connector embracing the shell and engaged with said wall contact of the receptacle when the fuse holder is in plugged-in position.

7. The fuse holder claimed in claim 6, the shell and the connector having releasably interengaged elements interlocking the shell and the connector against relative turning or longitudinal movement.

8. The fuse holder claimed in claim 6, the connector comprising a ring contact positioned at one end of the shell and further comprising opposite arms connected to the ring contact and extending lengthwise along the outer periphery of the shell.

9. The fuse holder claimed in claim 8, the connector being an integral member of resilient contact metal enabling the arms to be flexed away from their normal positions alongside the outer periphery of the shell, the arms and the shell having interengaged portions interlocking the shell and the connector, the interengaged portions being releasable by flexing the arms of the connector outwardly of the shell, whereby the shell and the connector may be disassembled.

10. As in claim 8, the engagement between the connector and the wall contact being obtained through engagement between at least one of the connector arms and the wall contact when the fuse holder is in plugged-in position.

11. As in claim 10, the ring contact of the connector being disposed at the lower end of the shell while the arms of the connector extend upwardly along the outside of the shelf, said socket structure being an Edison type fuse socket fixed onto the ring contact and reaching upwardly into the shell.

12. As in claim 10, said socket structure being an S type fuse socket within the shell, the contact ring of the connector being at the upper end of the shell and rimming the top end of the socket for engagement by the side terminal of an S type fuse inserted in the socket, while the arms of the connector extend downwardly along the outside of the shell.

13. As in claim 12, the S type socket being an integral internal structure of the shell.

14. As in claim 13, the S type fuse socketed shell and the connector being releasably assembled, whereby the same connector may be assembled to any of differently rated S type fuse socketed shells.

15. As in claim 6, the contact metal connector including an outer portion to engage the wall contact of the receptacle and further including an inner portion in the general form of a ring contact positioned at the lower end of the shell, and the socket being an Edison type fuse socket fixed at the bottom to the ring contact.

16. As in claim 6, the contact metal connector including an outer portion to engage said wall contact of the receptacle and further including an inner portion in the general form of a ring contact positioned at the upper end of the shell and the socket, and the socket being an S type fuse socket for mounting an S type fuse with the side terminal thereof engaged with the ring contact portion of the contact metal connector.

17. Fuse mounting means comprising a receptacle defining a fuse location, a fuse adapter provided with a fuse socket and externally formed for insertion into a predetermined operative position down in the receptacle, and means for trapping the adapter in the receptacle, the trapping means including a trap element of the receptacle and a coacting element of the adapter arranged to reach trapped relation to the trap element only upon the adapter reaching its predetermined operative position in the receptacle, the trap element of the receptacle comprising a blocking element and the coacting element of the adapter being an abuttable element, one of said elements being yieldable to enable the element of the adapter to ride past the trap element upon translational movement of the adapter to its predetermined operative position, the trap element then confronting the element of the adapter to abut it and block reverse movement of the adapter.

18. The fuse mounting means claimed in claim 17, one of said elements being accessible through the bottom of the receptacle to release the elements from trapping and trapped coaction so as to enable the adapter to be removed from the receptacle.

19. Fuse mounting means comprising a receptacle defining a fuse location, a fuse adapter provided with a fuse socket and externally formed for slip insertion down into the receptacle and for turning movement in a given direction to its operative position while down in the receptacle, and means for trapping the adapter in the receptacle, including a trap element of the receptacle and a coacting element of the adapter preventing reverse turning of the adapter when the adapter reaches its operative position, and the trapping means also including a hold-down element of the receptacle for preventing lifting of the adapter from its operative position, the adapter including an outer part consisting of an insulating shell fitting into the receptacle, the socket being inside the shell, and the adapter further including a spring metal member yoked to the shell and interlocked therewith against turning or longitudinal movement, the spring metal member including a ring contact at the upper end of the shell and an arm extending from the ring contact and down the outside of the shell and terminating at the lower end of the shell in an outwardly turned flange located below the level of said hold-down element of the receptacle when the adapter is set in down position therein, the flange moving under the hold-down element upon the adapter being turned in said given direction to operative position, and said spring strip comprising a downwardly flexed cantilever extension of the flange of the leg.

(References on following page)

References Cited by the Examiner

UNITED STATES PATENTS

| | | | |
|---|---|---|---|
| 813,353 | 2/1906 | Crouse | 200—130 X |
| 1,088,866 | 3/1914 | Benjamin. | |
| 1,658,583 | 2/1928 | Wells | 339—154 X |
| 1,729,877 | 10/1929 | Jennings | 317—119 |
| 1,849,744 | 3/1932 | Hart | 200—129 |
| 1,969,257 | 8/1934 | Cowles | 200—130 |
| 2,172,190 | 9/1939 | Corbett | 200—133 |
| 2,341,050 | 2/1944 | Landmeier | 200—133 |
| 2,637,764 | 5/1953 | Maxwell | 339—154 X |
| 3,056,872 | 10/1962 | Kolton | 200—133 |

BERNARD A. GILHEANY, *Primary Examiner.*

H. B. GILSON, *Assistant Examiner.*